(12) United States Patent
Bender et al.

(10) Patent No.: US 7,779,350 B2
(45) Date of Patent: *Aug. 17, 2010

(54) DYNAMIC CREATION OF AN APPLICATION'S XML DOCUMENT TYPE DEFINITION (DTD)

(75) Inventors: David Michael Bender, Austin, TX (US); Sharon Jean Lucas, Austin, TX (US); Charles Vaughn Rankin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/428,431

(22) Filed: Apr. 22, 2009

(65) Prior Publication Data

US 2009/0204633 A1 Aug. 13, 2009

Related U.S. Application Data

(63) Continuation of application No. 11/463,229, filed on Aug. 8, 2006, now Pat. No. 7,539,936, which is a continuation of application No. 10/122,033, filed on Apr. 11, 2002, now Pat. No. 7,143,343.

(51) Int. Cl.
*G06F 17/00* (2006.01)
(52) U.S. Cl. .................... 715/235; 715/200; 715/234; 715/236; 715/237; 715/238; 715/239; 715/249; 715/229; 715/255

(58) Field of Classification Search .............. 715/200, 715/234–239, 243, 255
See application file for complete search history.

(56) References Cited

U.S. PATENT DOCUMENTS

| | | | |
|---|---|---|---|
| 5,860,073 A * | 1/1999 | Ferrel et al. ................. 715/255 |
| 5,915,259 A * | 6/1999 | Murata ...................... 715/210 |
| 6,014,680 A | 1/2000 | Sato et al. |
| 6,061,697 A | 5/2000 | Nakao |
| 6,108,676 A | 8/2000 | Nakatsuyama |

(Continued)

OTHER PUBLICATIONS

DTD Tutorial, pp. 1-2 [online], copyright 1999-2002, Refsnew Data [retrieved on Apr. 3, 2002]. Retrieved from the Internet <http://www.w3schools.com/dtd/default.asp>.

(Continued)

*Primary Examiner*—Stephen S Hong
*Assistant Examiner*—David Faber
(74) *Attorney, Agent, or Firm*—Matthew W. Baca; Amy J. Pattillo

(57) ABSTRACT

The system, method and program of the invention enables a new DTD to be dynamically created during runtime from a preexisting DTD. A next document is processed and validated according to the new DTD. An interface is provided that enables plug-in providers to provide fragments of DTD information for at least one new element to be added and the name of the element that is to be added to an existing parameter entity. All of the fragments from each plug-in provider are concatenated together and combined with the static header information of the preexisting DTD to form the new DTD.

5 Claims, 6 Drawing Sheets

U.S. PATENT DOCUMENTS

| | | |
|---|---|---|
| 6,289,501 B1 | 9/2001 | Mutschler, III |
| 6,519,617 B1 * | 2/2003 | Wanderski et al. .......... 715/235 |
| 6,654,734 B1 * | 11/2003 | Mani et al. ..................... 707/2 |
| 6,711,740 B1 | 3/2004 | Moon et al. |
| 6,912,538 B2 | 6/2005 | Stapel et al. |
| 7,013,426 B1 | 3/2006 | Ingersoll |
| 2002/0107881 A1 | 8/2002 | Patel |
| 2002/0147748 A1 | 10/2002 | Huang et al. |
| 2004/0205567 A1 | 10/2004 | Nielsen |

OTHER PUBLICATIONS

Simpson, DTD Generator, DTD Generator Frontend, pp. 1-2 [online], copyright 1999 Prentice Hall PTR [retrieved on Mar. 24, 2002]. Retrieved from the Internet <http://www.pault.com/pault/dtdgenerator.net>.

Kay, DTDGenerator—A tool to generate XML DTDs, Saxon DTD Generator a tool to general XML DTDs, pp. 1-5 [online], dated Apr. 13, 1999 [retrieved on Mar. 24, 2002]. Retrieved from the Internet <http://users.iolway.co.uk/mhkay/saxon/saxon5-5-1/dtdgen.html>.

Untitled Document, Comparing Diff Tools, pp. 1-13 [online], [retrieved on Feb. 6, 2002]. Retrieved from the Internet <http://www.dommitt.com/v1.1pages/dsml-compare.htm>.

Dommitt, Inc., XML Diff and Merge Utility Dommitt Diff and Merge Utility for XML, pp. 1-7 [online], [retrieved on Feb. 6, 2002]. Retrieved from the Internet <http://www.dommitt.com/v1.1pages/storx.htm >.

XML DTD Tutorial, DTD-Table of Contents, pp. 1-2 [online], copyright 1999-2002 INT Media Group, Incorporated [retrieved on Apr. 5, 2002]. Retrieved from the Internet <http://www.xml101.com/dtd>.

* cited by examiner

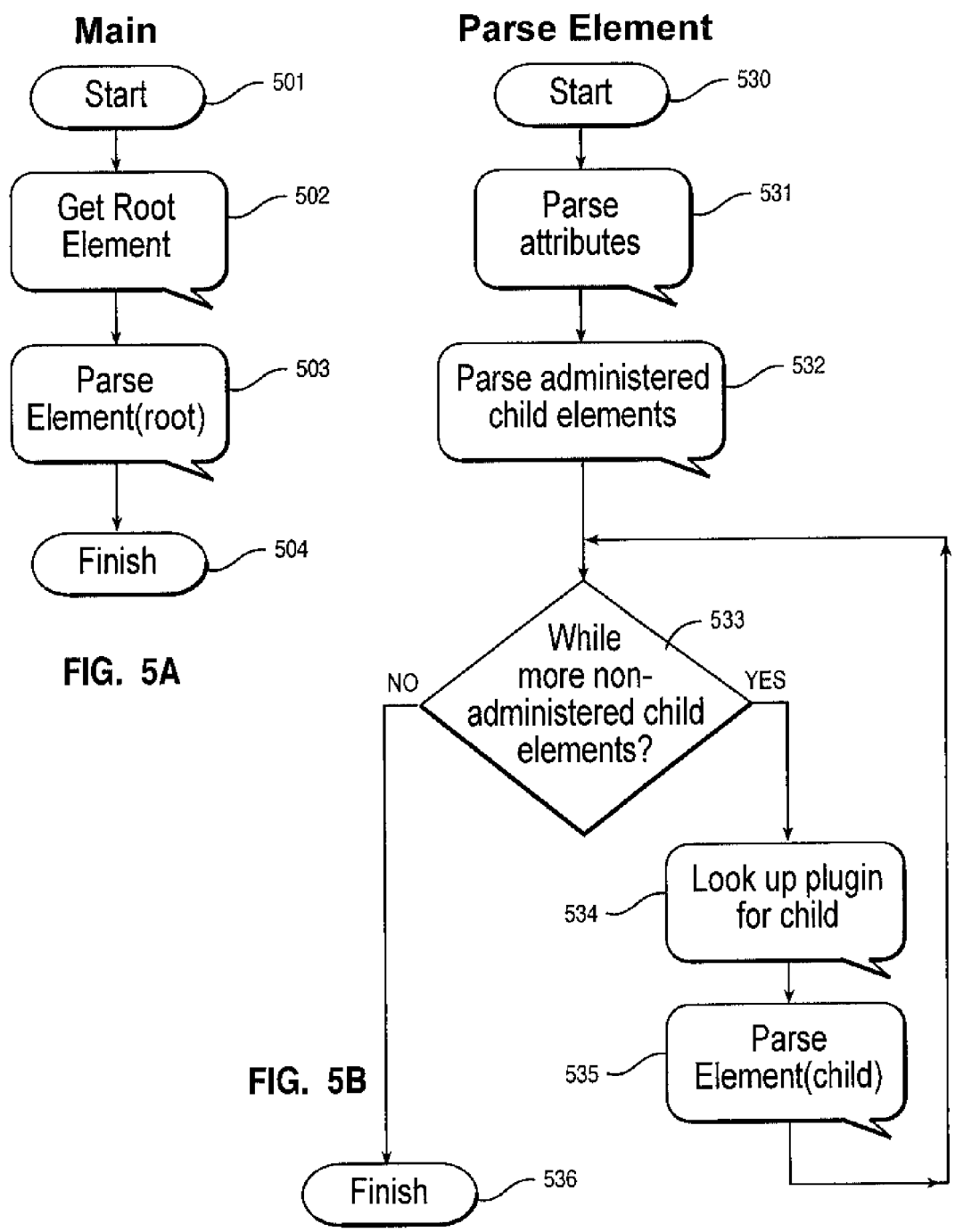

US 7,779,350 B2

DYNAMIC CREATION OF AN APPLICATION'S XML DOCUMENT TYPE DEFINITION (DTD)

CROSS-REFERENCE TO RELATED APPLICATIONS

This application is a continuation of commonly assigned U.S. patent application Ser. No. 11/463,229, filed Aug. 8, 2006 now U.S. Pat. No. 7,539,936, which is a continuation of U.S. patent application Ser. No. 10/122,033, filed Apr. 11, 2002 now U.S. Pat. No. 7,143,343, which are hereby incorporated herein by reference.

BACKGROUND OF THE INVENTION

1. Field of the Invention

This invention relates to processing Web documents, and more specifically to a system, method, and program for dynamically generating a document type definition during runtime.

2. Description of the Related Art

The Internet, initially referred to as a collection of "interconnected networks", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the TCP/IP suite or protocols.

Currently, the most commonly employed method of transferring data over the Internet is to employ the World Wide Web environment, referred to herein as "the Web". Other Internet resources exist for transferring information, such as File Transfer Protocol (FTP) and Gopher, but have not achieved the popularity of the Web. In the Web environment, servers and clients effect data transfer using the Hypertext Transfer Protocol (HTTP), a known protocol for handling the transfer of various data files (e.g., text, still graphic images, audio, motion video, etc.).

These data files, referred to herein as Web pages or documents, are typically written in a markup language. These markup languages may include Hypertext Markup Language (HTML), extensible markup language (XML), Standard Generalized Markup Language (SGML), etc. SGML is the international standard for defining descriptions of the structure of different types of electronic documents. SGML is very powerful and complex. HTML is a smaller application of SGML. HTML defines a very simple type of report-style documents, with section headings, paragraphs, lists, tables, illustrations, hypertext, and multimedia.

XML is also a smaller version of SGML. XML has retained enough of the useful functions of SGML, but has removed some of SGML's optional features that makes SGML too complex to program for in a Web environment. Unlike HTML, XML does not have a fixed format; hence, it is referred to as being extensible. XML is a meta language for describing other customized markup languages that are used in defining the structure of a limitless number of different types of documents. All XML documents are made up of the following: elements, tags, attributes, entities, PCDATA, CDATA. It should be noted that XML is not just for Web pages. It can be used to store any kind of structured information, and to enclose or encapsulate information in order to pass it between different computing systems.

XML is not dependent on a single, inflexible document type, as HTML is. Nor does XML have the complexity of full SGML. XML allows the flexible development of user-defined document types. It provides a robust, nonproprietary, persistent, and verifiable file format for the storage and transmission of text and data both on and off the Web.

A Document Type Definition (DTD) is a set of rules that a document follows. More specifically, these rules generally state the name and contents of each element and in which context it can and must exist. A DTD defines the document structure with a list of elements that are defined for the XML document. A DTD allows each XML file to carry a description of its own format with it. This enables independent groups of people to agree to use a common DTD for interchanging data that is of interest to their own specific group, i.e., domain. An application can then use that domain's standard DTD to verify that the application's data and/or the data being received is valid. This verification is performed before the application processes and displays the document.

A well formed XML document is a document that conforms to the XML syntax rules. A valid XML document is a well formed XML document, which also conforms to the rules of a DTD. The primary difference between valid and well formed XML is whether or not there is a DTD. Well formed XML is designed for use without a DTD, whereas valid XML requires a DTD. The W3C XML specification states that a program should not continue to process an XML document if it finds a validation error. This helps ensure that browsers handling XML documents will be compatible. In contrast, many HTML browsers are not compatible with each other because HTML allows formatting errors such as the omission of end tags. HTML browsers have different ways of interpreting what was intended when there is an error, and thus may process the same document differently, thereby leading to incompatibility between browsers.

As such, in order for a browser to process an XML document, the XML document must be well formed and valid. A precise way to check the well-formedness and validity of one's valid XML document is to use a parser which checks for errors in XML documents. A validating XML parser can be used to check valid XML documents. When an XML document is processed, it is compared with the DTD to be sure it is structured correctly and all tags are used in the proper manner. This comparison process, performed by the parser, is called validation. Parsers are a helpful tool in understanding the reason why an XML document is not being read properly. Parsers can also be used while an XML document is being created in order to ensure that the XML document is being created correctly.

An advantage of utilizing DTDs for XML documents is that a given document can be readily validated in accordance with its DTD; and consequently be successfully processed and displayed. As such, for an XML document that may not have a DTD associated with it, it is known in the art to construct a DTD from a given XML document. There are programs that exist that will analyze the XML document and create a DTD based upon that document.

A disadvantage of utilizing DTDs for XML documents, however, is that an XML document being created must conform to its associated DTD to be valid. It may be desirable to extend an XML document that varies from its associated DTD without creating a completely separate DTD.

It is known to merge an existing fully valid complete DTD with another existing fully valid complete DTD to create yet another DTD for use at a later time. The created DTD is not, however, being processed in real-time. The merging does not take place during runtime. Furthermore, because the merging of two DTDs can be done without any knowledge of the domain associated with the DTD, entities may be created that are not usable in the context of the specific domain of the XML documents.

It is easy to extend an XML document that has no DTD. However, in order for a parser to validate an XML document, a DTD (Document Type Definition) must be provided. When a DTD is provided, the XML document is no longer extensible. For example, in order to enable an XML document to be validated, a static XML DTD file, which cannot be extended or changed, may be provided. As such, users provide portions of DTDs in files. The master DTD includes references to the other files on the file system. However, this is merely a static inclusion of text files.

However, a problem exists if one wants to allow customers to add new elements to the document, making the document extensible, and still perform validation. For example, if a DTD file is provided, and customers are allowed to manually edit it, the customers could change existing elements which may cause problems. If the new elements are not defined in the DTD, then validation of documents with these new elements will fail.

One of the problems being faced is a way in which to create an XML document that can be validated which requires the use of a document type definition (DTD), but also allow a given document type to be extended by plug-ins, i.e., by having users plug in to an architecture. Generally, DTDs are fixed constraints on XML documents. These fixed constraints can reside either externally to the document itself, such as a reference to a file name that contains the definition; or they can be contained in-line within the document itself. Although it is desirable to be able to extend a document type definition, it is not desirable to allow a user to arbitrarily create extensions to a document type definition. It is desirable to ensure that the types of documents being parsed are related to the subject matter at hand, i.e., the domain or context in which the XML document was originally created. As such, a user should not be able to define inline within their document DTD extensions since the user could just insert arbitrary text within the internal DTD. On the other hand, an external non-extensible DTD file is not desirable, either.

SUMMARY OF THE INVENTION

It is therefore an object of the invention to enable extensions to be added to the DTD and, at the same time, prevent existing elements from being changed which otherwise could cause application problems if the corresponding XML document could not be validated.

It is therefore a further object of the present invention to enable a document to be extensible while also being able to be validated.

It is therefore a further object of the present invention to dynamically create an application's XML DTD.

It is a further object of the invention to enable a DTD to be reconstructed by changing its elements during runtime thereby enabling the reconstructed DTD to be utilized during the parsing of a next document.

The system, method, and program of the present invention dynamically creates an application's XML DTD. This enables an XML to be extensible by allowing plugging in XML elements, while still preserving the ability to validate an XML document which requires a DTD.

An interface is externalized which can be implemented to add new elements into a DTD and to integrate new elements with existing ones by adding an entry for a new element to a parameter entity in the DTD. A DTD is dynamically created by combining static header XML information, parameter entities produced from the plug-ins' element names, and element information produced from the plug-ins' DTD information.

As such, the DTD plug-ins are dynamically added or removed, even at runtime. These changes can be temporary, such that only one or more documents are affected by the change until a new DTD is dynamically constructed for that application during runtime.

As such, customer's now have the ability to add extensions to an application's XML DTD to support the customer's own unique elements without requiring any changes to the existing application; while still preserving the ability to validate the XML documents. An application's XML DTD is dynamically created such that the corresponding document is extensible, and it can also be validated. Customers can add extensions to an application's XML DTD in order to provide additional functionality.

Besides providing additional functionality by plugging in new XML elements to a DTD, another advantage of the invention is that it preserves the ability to validate XML documents containing new plug-in elements. This further enables an XML application to be more flexible and usable. Furthermore, the extensions are allowed to be added to an XML DTD by customers, while protecting against changes to existing elements in the DTD which could cause application problems. A further advantage is that an application is made more flexible and usable by a larger number of customers since the customers can add extensions to customize the application to meet specific needs.

The present invention is carried out without merging DTDs and without generating a DTD based upon XML document content. Furthermore, the tool of the present invention is not a DTD editor.

BRIEF DESCRIPTION OF THE DRAWINGS

For a more complete understanding of the present invention and the advantages thereof, reference should be made to the following Detailed Description taken in connection with the accompanying drawings in which:

FIG. 5A illustrates a process flow and logic for plug-in elements to walk the DOM tree; and FIG. 5B illustrates a process flow and logic for parsing an element.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

In general, the present invention is preferably executed in a computer system that performs computing tasks such as manipulating data in storage that is accessible to the computer system. In addition, the computer system preferably includes at least one output device and at least one input device.

Figure 1:
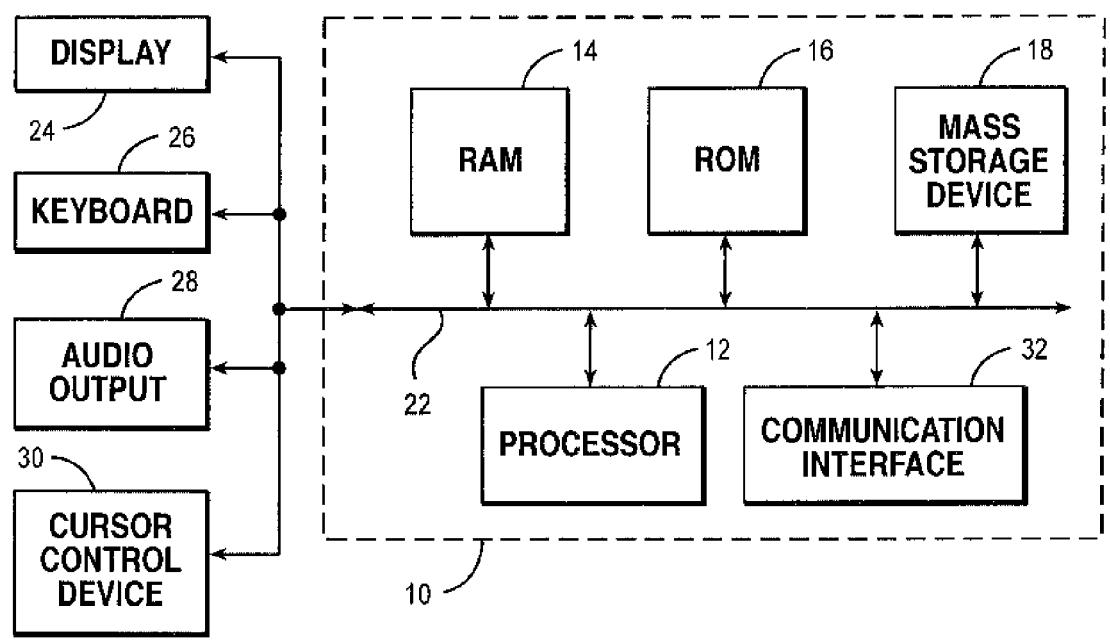
FIG. 1 depicts one embodiment of a computing system with which the method, system, and program of the present invention may be advantageously utilized.

Referring now to the drawings, and in particular to FIG. 1, there is depicted one embodiment of a computer system with which the method, system, and program of the present invention may be advantageously utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as a random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts described herein. Alternatively, the steps of the present invention might be performed by specific hardware components that contain hardwire logic for performing the steps, or by any combination of programmed computer components and custom hardware components.

Further, multiple peripheral components may be added to computer system 10. For example, a display 24 is also attached to bus 22 for providing visual, tactile or other graphical representation formats. Audio output through a speaker or other audio projection device may be controlled by audio output device 28 attached to bus 22. A keyboard 26 and cursor control device 30, such as a mouse, track ball, or cursor direction keys, are coupled to bus 22 as interfaces for user inputs to computer system 10. It should be understood that keyboard 26 and cursor control device 30 are examples of multiple types of input devices that may be utilized in the present invention. In alternate embodiments of the present invention, additional input and output peripheral components may be added.

The present invention may be provided as a computer program product, included on a machine-readable medium having stored thereon the machine executable instructions used to program computer system 10 to perform a process according to the present invention. The term "machine-readable-medium" as used herein includes any medium that participates in providing instructions to processor 12 or other components of computer system 10 for execution. Such a medium may take many forms including, but not limited to, nonvolatile media, volatile media, and transmission media. Common forms of nonvolatile media include, for example, a floppy disk, a flexible disk, a hard disk, magnetic tape or any other magnetic medium, a compact disc ROM (CD-ROM), a digital video disc-ROM (DVD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of nonvolatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer to a requesting computer system by way of data signals embodied in a carrier wave or other propagation medium via a network link (e.g., a modem or network connection) to a communications interface coupled to bus 22. Communications interface 32 provides a two-way data communications coupling to network link which may provide wired and/or wireless network communications to one or more networks.

Figure 2:
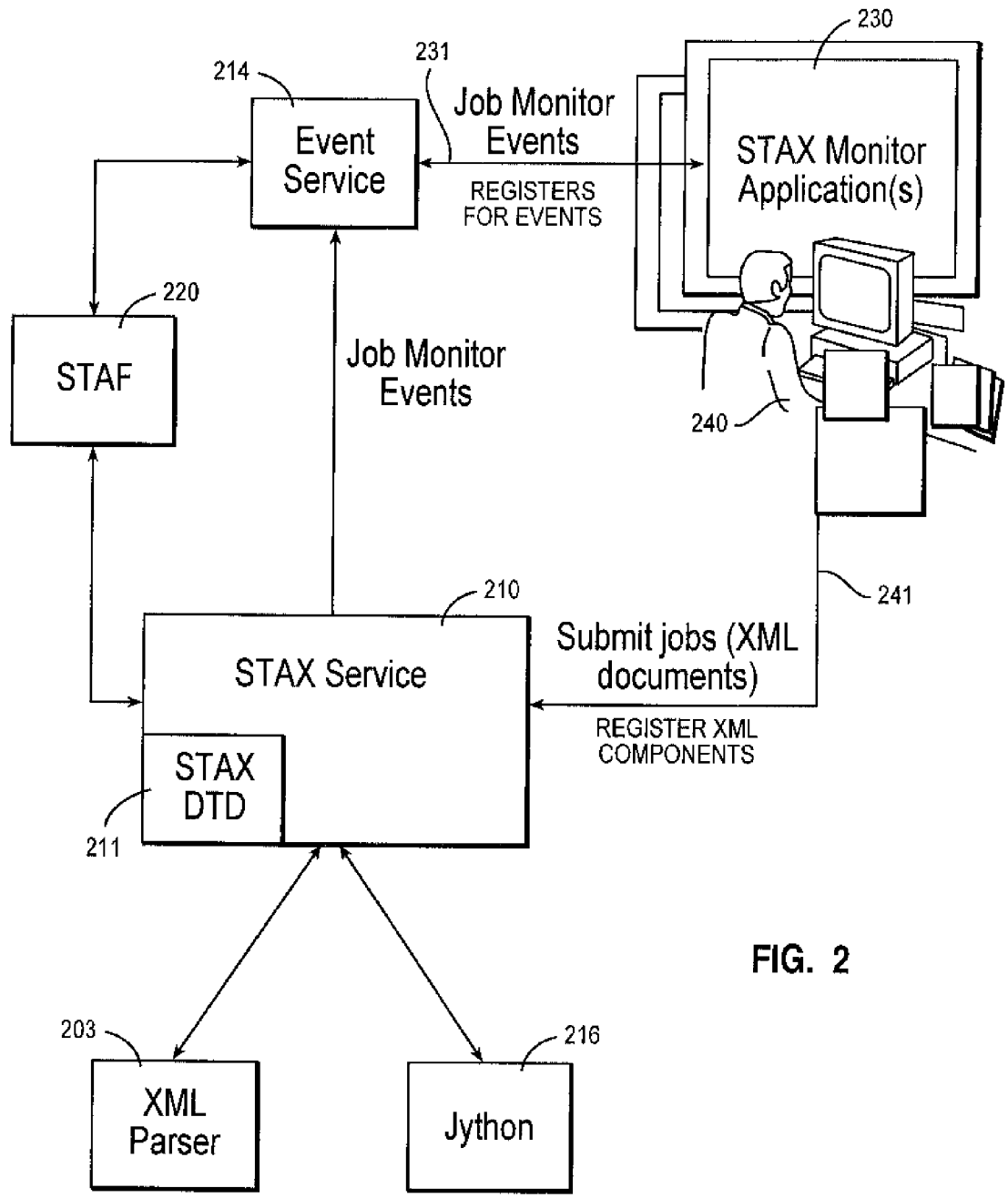
FIGS. 2 and 2B are block diagrams showing the components of a software test automation framework in which a preferred embodiment may be implemented.
Figure 2B:
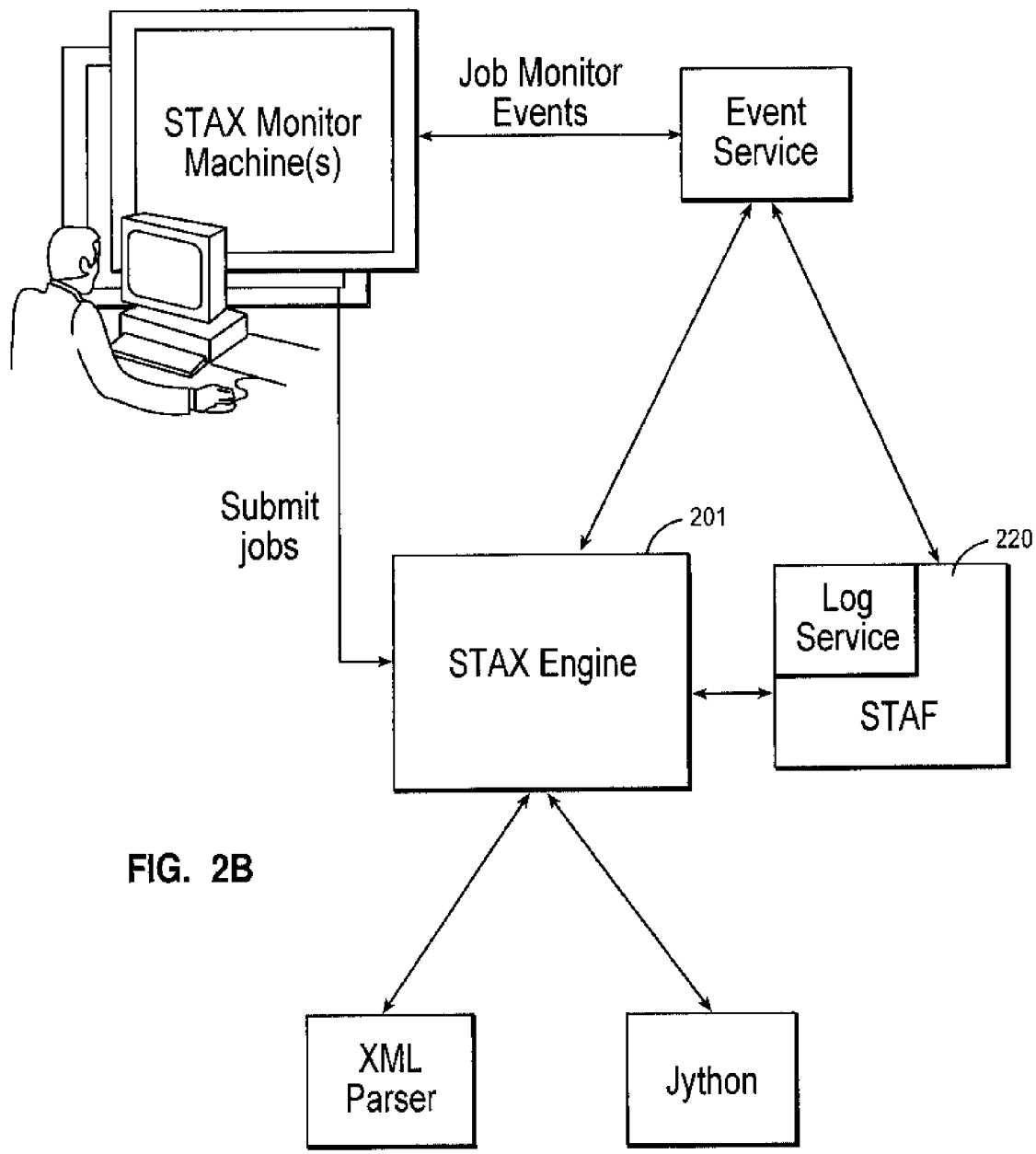

FIGS. 2 and 2B illustrate the testing framework in which the present invention may be advantageously utilized. The Software Test Automation Framework (STAF) 220 is designed around the idea of reusable components. It is intended to make it easier to create automated test cases and workloads. As such, a preferred embodiment of the system, method, and program of the invention is implemented as an XML-based execution engine referred to as STAX (STAf execution engine) implemented as an external Java STAF service 210 to a software testing automation framework 220. STAX is designed to make it easier to automate the workflow of tests and test environments. STAX 210 also utilizes parser 203 to validate XML documents.

Applications 240 can provide extensions, i.e., additional XML elements, to STAX (Software Testing Automation execution engine) to provide additional functionality by registering XML components via process flow 241. STAX dynamically creates the DTD, (i.e., STAX DTD 211), at initialization time, which allows the application's extension elements to be included in the DTD, without adversely affecting existing DTD elements.

XML components are registered with the STAX service 210 so that they can become part of the STAX DTD 211. Each XML component that registers with the STAX Service must provide the following methods:

getDTDInfo—returns the DTD information for the component getDTDTaskName—returns the element name to add to the task entity element parseAction—handles the parsed component data provided by the XML Parser 203.

The STAX Service 210 dynamically generates a STAX DTD 210 by calling the getDTDinfo and getDTDTaskName methods for each XML component that has been registered with the STAX Service 210, and by adding some static STAX DTD header information. The STAX XML DTD 211 is stored in memory of the computer system running the STAX Service 210.

The STAX Service 210 also accepts job definitions, submitted in the form of XML documents, via process flow 241. Fundamentally, these job definitions allow a user to specify the action elements necessary to perform the job. When a job (an XML document) is submitted to the STAX Service 210, the STAX Service 210 sends the XML document to an XML Parser 203 to be validated and parsed. The XML Parser 203 checks for document validity by validating the XML document against the STAX DTD 211. The XML Parser 203 breaks up the XML document into its component parts and makes them accessible to the STAX Service 210 which performs the parseAction method provided for each XML component.

The STAX Monitor application 230 is a GUI interface to the STAX Service 210. This application 230 displays a graphical representation of the currently running elements for a given job to monitor events through process flow 231. The STAX Monitor 230 makes it easy to see which processes and STAF commands are currently running as well as the blocks which contain them. The STAX Monitor can also be used to submit a request to execute a job, via process flow 241, in addition to monitoring the job, process flow 231.

The Event Service 214 provides an interface to allow process communication based on events occurring. For instance, a STAX Monitor 230 registers with the Event Service 214 to tell it that it is interested in STAX Job Monitor events. The STAX Engine tells the Event service 214 when a STAX job begins and ends and when blocks, processes, and STAF commands in each job begin and end. The Event Service 214 then notifies the STAX Monitor applications 230 that have registered interest in the STAX Job Monitor events when these events occur.

STAX uses the Python scripting language for variable and expression evaluation. The Python code is executed by Jython 216, a version of Python written entirely in Java. This allows STAX to take advantage of the powerful and easy-to-use features of Python.

The above described preferred embodiment of the invention typically involves a run time system that stays up and running for a long period of time and is fed XML documents periodically. A user requests the system to bring in an XML document, parse it, and take some kind of action based on the content of the XML document, and then continue processing. Such a long running system is different from a system where a user may invoke an executable, the system reads one XML document, and then finishes processing. In contrast, the system of the present invention stays up and running for a long period of time, takes users requests, then reads XML documents, and continues processing.

One of the features of the parser 203 used in the present invention is that it is able to parse an XML DTD on the fly. As such, it became desirable to be able to construct an extensible DTD in a dynamic fashion.

In the preferred embodiment described above, the JAVA interface was created to allow plug-in providers to define the characteristics of their segments of documents of a given document type. The plug-in provider only defines the elements and attributes of those elements that the particular plug-in provider is interested in and knows how to handle. That is, the plug-in provider provides the fragment of the DTD that encompasses their segment of the documents. The plug-in provider does not need to provide the whole DTD.

The tool of the present invention receives all of these fragments and combines them together with the static information, such as the header information of a standard DTD, with sets of predefined entities. The DTD fragments received from plug-in providers for a given document type are concatenated together. It should be noted that whole DTDs are not being merged together, but rather fragments of a DTD are being combined into one DTD. The complete DTD, with the combined concatenated fragments, is then fed to the parser for the parser to validate the current document.

In general, the system, method and program of the invention provides the ability for customers to add extensions to an application's XML DTD to support the customer's own unique elements without requiring any changes to the existing application; while still preserving the ability to validate the XML documents. An interface is externalized which customers can implement to add new elements to the DTD. The interface also provides a way to integrate new elements with existing ones by adding an entry for a new element to a parameter entity in the DTD.

Figure 3A:
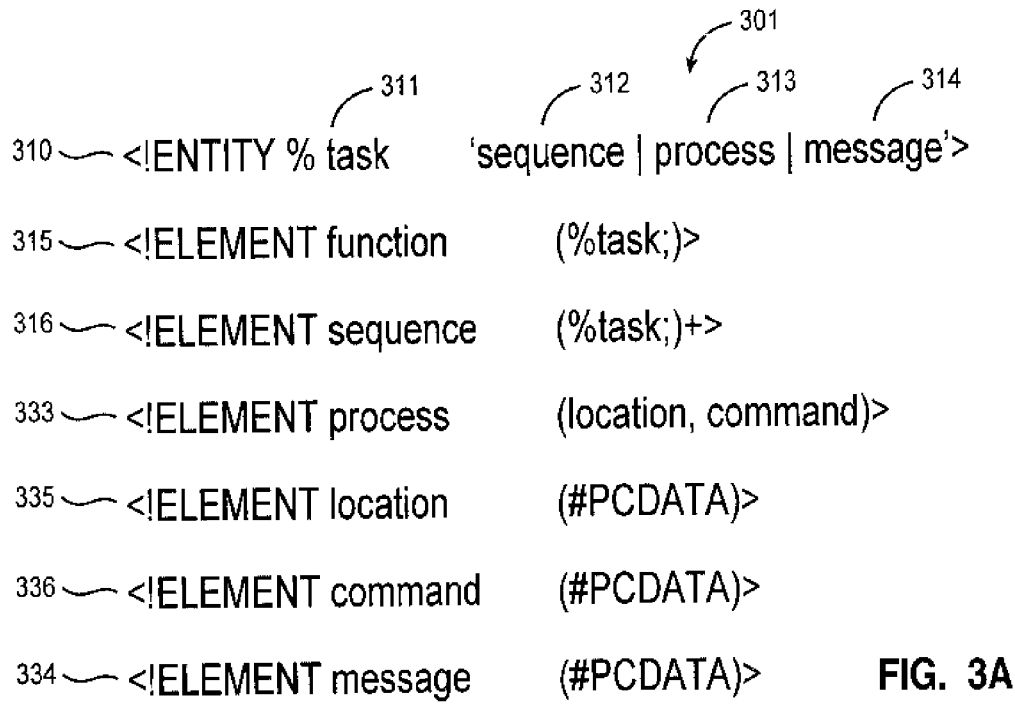
FIG. 3A illustrates a sample DTD.

For example, for an existing DTD 301, as shown in FIG. 3A, and as follows:

```
<!ENTITY % task         'sequence | process | message'>
<!ELEMENT function      (% task;)>
<!ELEMENT sequence(% task;)+>
<!ELEMENT process       (location, command)>
<!ELEMENT location      (#PCDATA)>
<!ELEMENT command           (#PCDATA)>
<!ELEMENT message       (#PCDATA)>
``` a new element called <testcase> could be added. It could contain any element defined by the task parameter entity 310. The new testcase element itself could be part of the task parameter entity 310.

More specifically, DTD 301 has a parameter entity 310 named "task" 311. The existing "task" parameter entity 311 defines the elements "sequence" 312, "process" 313 and "message" 314 that can be sub-elements of one or more existing elements in the DTD. The elements "function" 315, "sequence" 316, "process" 313, and "message" 314, are predefined in the DTD. To this existing DTD 301, a new "testcase" element is provided. A provider of this plug-in would implement an interface to provide their portion of the new DTD.

The interface requires that the following methods be provided by the plug-in provider:

a method (getDTDInfo) that returns a string containing the DTD information for the new element(s)

a method (getElementName) that returns the name of an element to add to an existing parameter entity. This allows an integration of new elements into existing entities.

a method (parseAction) to parse the XML provided for this element.

In this scenario the getDTDInfo( ) method returns the definition of the element "testcase" and that the "testcase" element can contain one of these tasks. Tasks are managed for the plug-ins. In this example, all of the plug-in elements have identified themselves as tasks. As such, the plug-in can specify an element to contain any other task. The portion of the plug-in's DTD can define more than just the "testcase" element by having other child elements. For example, the "process" plug-in element 333, FIG. 3A, also defined the "location" 335 and "command" 336 elements.

At runtime, all of the DTD pieces are queried and the entities are built up. The application dynamically creates a DTD by combining the following information into a DTD stored in memory:

static header XML information

Updated parameter entities which include new elements obtained using the output from each interface's getElementName( ) method The output from each interface's getDTDInfo( ) method which defines the DTD information for new elements.

Figure 3B:
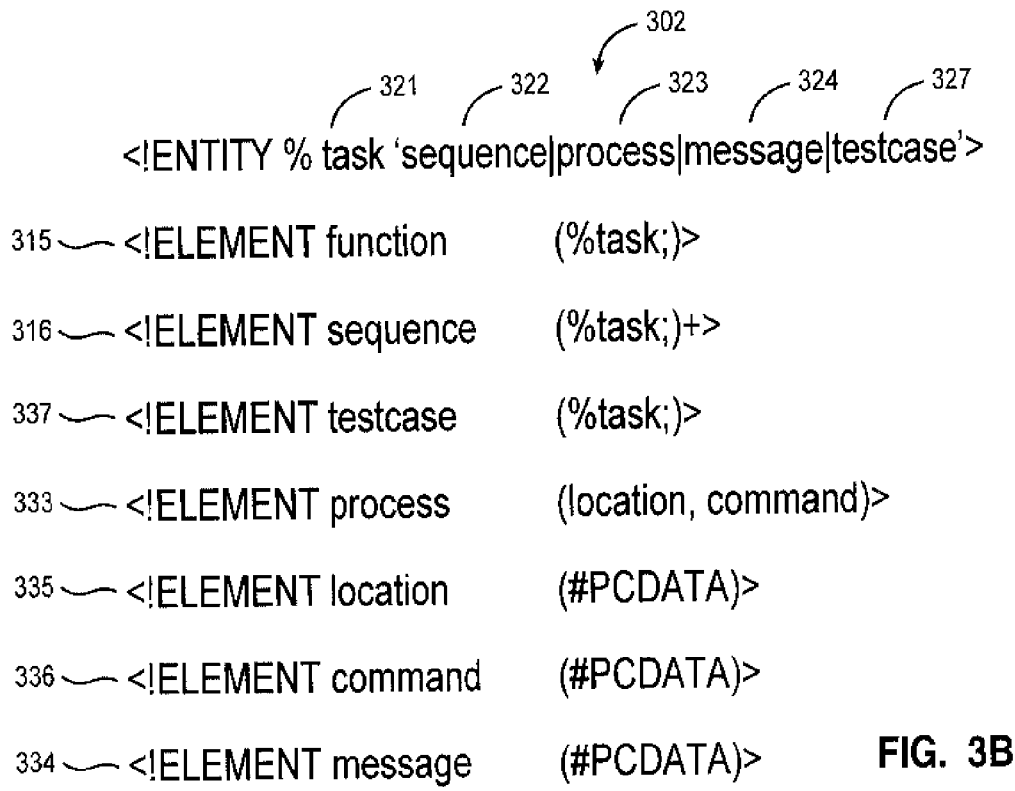
FIG. 3B illustrates a new dynamically extended DTD from the DTD shown in FIG. 3A.

For example, the "task" entity 321, FIG. 3B, now contains the "testcase" element 327, where before the "task" entity 311, FIG. 3A, only contained "sequence" element 312, "process" element 313, and "message" element 314, FIG. 3A. The "testcase" part 327, 337, of the DTD is now included in the rest of the DTD 302, FIG. 3B. The other pieces of the DTD—sequence 316, process 333, and message 334—are all plug-in elements that were previously provided. The first case, as shown in FIG. 3A, assumed that there were only three (3) plug-in elements: sequence, process, and message. The location element 335 and command element 336 are sub elements of the process element 333. The other element, function, is the root element, which in XML means that it must contain all other elements. Thus, function is not a plug-in element. FIG. 3B illustrates the scenario of having another plug-in element, testcase, and how the DTD would change.

Other domains would enable additional other types of entities to be extended and to provide mechanisms to associate given elements with specific entities. In the present preferred embodiment, only the task entity was necessary for this present domain for automated testing. Other domains may have multiple entities to which a specified element may belong. As such, a method of the interface, i.e., "getElementName", could be extended to specify to which entity an element is bound.

For example, to have DTD 302 shown in FIG. 3B, dynamically constructed, a plug-in implements the following methods on the interface. The interface extends the DTD by providing the following:
- a getDTDInfo( ) method that returns "<ELEMENT testcase(% task;)>".
- a getDTDTaskName( ) method that returns "testcase"
- a parseAction method for the testcase element. It should be noted that classes are available to help parse task elements.

By implementing the interface as described, the following dynamically created DTD, also as shown in FIG. 3B, is shown as:

```
<!ENTITY % task 'sequence|process|    message|testcase'>
<!ELEMENT function          (% task;)>
<!ELEMENT sequence (% task;)+>
<!ELEMENT testcase          (% task;)>
<!ELEMENT process           (location, command)>
<!ELEMENT location          (#PCDATA)>
<!ELEMENT command           (#PCDATA)>
<!ELEMENT message           (#PCDATA)>
```

The above extended DTD 302 still allows XML documents that use the new "testcase" element to be validated.

It should be noted that there are some predefined entities that are created on the fly. For example, one of these entities is a "task" which represents any other child element that may be desired to be contained. For instance, a sequence 332, FIG. 3B, allows a task to be embedded within a sequence which allows there to be a sequence of tasks. A plug-in provider would provide an identification of the elements that are tasks. As such, in order to allow others to embed a task, there is a determination, element by element, of which elements being provided is a task that can be reused by other users.

This feature can be extended to provide various other predefined sets of entities that are specific to an environment of other embodiments. For example, the present preferred embodiment is implemented in an automation or testing environment where the concept of a task is relevant to that embodiment. Extending a DTD with additional elements can be further carried out with any variety of entities that are specific to a certain domain. The plug-ins can be queried for the types of elements that are being provided by the given plug-in provider that fall into those categories. Other plug-in providers can then use these entity names to refer to these types of elements without knowing before hand what they will end up being.

As such, the tool of the present invention provides the header information 310, FIG. 3A, and queries all of the plug-ins for the predefined elements, e.g., the tasks for the domain of this preferred embodiment; combines these together to create the entities that are part of the DTD; and then concatenates all of the fragments that the plug-ins provide to construct the DTD 302, FIG. 3B. If a plug-in desires to be a part of this environment, the plug-in would implement the defined interface as described above.

As such, elements can be changed, e.g., added or removed, in a DTD dynamically during runtime. Each of the elements and their attributes are retrieved from the plug-ins which provides a section of the DTD to be plugged in. At any point in time, while the system is running, a DTD can be reconstructed for the next document that is ready to be parsed.

Figure 4:
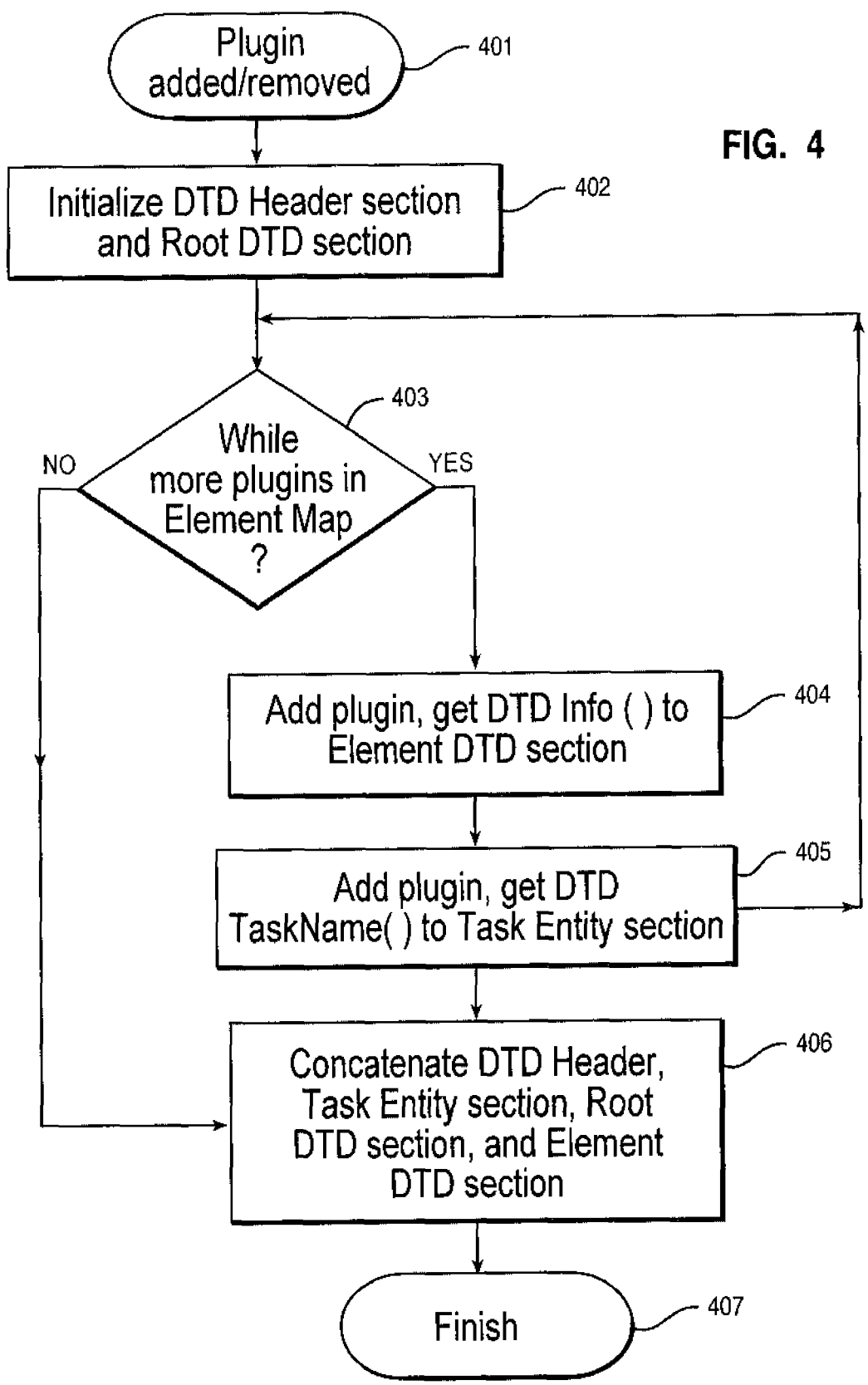
FIG. 4 illustrates a process flow and logic for dynamically constructing a DTD.

FIG. 4 illustrates a process flow and logic for defining how the DTD is constructed based on the different plug-ins. When any one or more plug-ins are to be added or removed, 401, the DTD header section and Root DTD section is initialized, 402. For each plug-in in the element map, 403, the information from the getDTDInfo( ) method is added to the Element DTD section, 404. Then the information from the getDTDElementName( ) method is added to the corresponding entity section, 405. The process repeats back to step 403. If there are no more plug-ins in the Element map, 403, then the process continues at 406 where the DTD header, "Task" Entity section, Root DTD section and Element DTD section are concatenated. The construction of the DTD is then finished, 407.

At runtime, the new element names are looked up dynamically. When an XML parser parses a document, the parser walks down the nodes in the Document Object Model (DOM). As the nodes in the DOM are walked down, the handlers associated with the different child elements are allowed an opportunity to have their data captured. A table is kept with the various element names provided by the handlers. The elements names are mapped to the actual implementation objects. During parsing, if at a particular portion in the DOM tree it is determined that a node, for example, a node known as a sequence, needs to be parsed, then the mapping table is examined to find who owns sequence elements. The parsing method of the owner of the element is then called. The parsing method of the owner of the element then performs the parsing of that section of the DOM tree.

As such, a parse method, for the element being added, is used to parse post processed documents. It should be noted that classes are available to help parse elements.

FIGS. 5A and 5B illustrate the process flow and logic of how the plug-in elements walk the DOM tree. With respect to FIG. 5A, the process begins 501 by getting a root element, 502. After the root element is parsed, 503, the process finishes 504. More specifically, a root element is parsed as shown in FIG. 5B. The process begins 530 when the attributes of the root element are parsed, 531. Then the administered child elements are parsed, 532. For each non-administered child elements, 533, the plug-in for that child is looked up, 534. The child elements are parsed, 535, by recursively calling "Parse Element", 530, and the process continues back to 533. When there are no more child elements, 533, the process ends, 536.

The system, method, and program of the present invention validates the XML documents. Without a document type definition, a document cannot be validated. Validating ensures, for example, that within a function certain elements and attributes are allowed. Without the DTD, after the parser processes the document and a DOM tree is generated, an application would have to be careful of what is underneath the DOM tree since it has not been validated. The application may then run into tags unknown to the application. With a validated document, the application can be ensured that only elements and attributes that the application knows about are being utilized for a specific document type. As such, even in a runtime environment, errors in a document can be discovered during parsing time before the application actually utilizes the document. Validating an XML document eliminates processing problems for applications that process the output from a parser parsing an XML document.

The runtime environment provides restrictions on who can provide plug-ins. The practice is that the plug-ins are authenticated and tested and validated to ensure that the plug-ins do not do anything improper with the runtime system, such as having arbitrary elements. Since the system administrator validates that the plug-ins meet their specifications, then all of the users that the system administrator is responsible for are now bound by the DTD provided for by the plug-ins. A plug-in provides element names that are valid and fragments of DTDs. It is assumed that the plug-ins are from trusted sources that have been previously authenticated as being a valid unit that can be plugged in. Users that are constructing the documents that are being fed to the runtime system, that are actually being parsed up, have no means to extend the DTD. The present invention does not attempt to create a DTD based upon these end user documents. The present invention creates a DTD from other pieces of DTDs provided by applications. The users are restricted as to the elements and attributes that can be used in accordance to an existing DTD. These users must obey the DTD that has been defined at runtime when they feed a document to the runtime system. As such, these end users are restricted from adding elements and confusing the runtime system, as well as providing them the benefit of validation to ensure that a user has not accidentally typed something wrong into their XML document. Although it is quite easier to write a well-formed document than a valid document, a DTD enables a parser to provide feedback as to whether the document is indeed also valid.

The preferred embodiments may be implemented as a method, system, or article of manufacture using standard programming and/or engineering techniques to produce software, firmware, hardware, or any combination thereof. The term "article of manufacture" (or alternatively, "computer program product") as used herein is intended to encompass data, instructions, program code, and/or one or more computer programs, and/or data files accessible from one or more computer usable devices, carriers, or media. Examples of computer usable mediums include, but are not limited to: nonvolatile, hard-coded type mediums such as CD-ROMs, DVDs, read only memories (ROMs) or erasable, electrically programmable read only memories (EEPROMs), recordable type mediums such as floppy disks, hard disk drives and CD-RW and DVD-RW disks, and transmission type mediums such as digital and analog communication links, or any signal bearing media. As such, the functionality of the above described embodiments of the invention can be implemented in hardware in a computer system and/or in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for use in a CD ROM) or a floppy disk (for eventual use in a floppy disk drive), or downloaded via the Internet or other computer network, as discussed above. The present invention applies equally regardless of the particular type of signal-bearing media utilized.

The foregoing description of the preferred embodiments of the invention has been presented for the purposes of illustration and description. It is not intended to be exhaustive or to limit the invention to the precise form disclosed. Many modifications and variations are possible in light of the above teaching. For example, although preferred embodiments of the invention have been described in terms of a software test automation framework, the present invention is applicable in other environments and frameworks as well.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

Having thus described the invention, what we claim as new and desire to secure by Letters Patent is set forth in the following claims.

The invention claimed is:

1. A computer system having means for processing documents having a document type definition (DTD), comprising:
at least one processor coupled to memory,
wherein the at least one processor further comprises:
means for receiving at least one extension to a preexisting document type definition of an application during runtime comprising a plug-in with a DTD fragment having elements and attributes;
means, responsive to receiving the at least one extension to the preexisting document type definition of the application during runtime, for automatically dynamically creating, during runtime, a new document type definition including the at least one extension from the preexisting document type definition of the application by combining static header XML information of the preexisting document type definition, updated parameter entities of the preexisting document type definition produced from added element names of the elements and attributes of the plug-in, and element information for the added element names produced from the plug-in DTD fragment, wherein the new document type definition continues to support validation of previous documents for the application; and
means for parsing a next document received by the application according to the dynamically created document type definition.

2. The computer system of claim 1 wherein the means for dynamically creating further comprises:
means for receiving the at least one extension to the preexisting DTD registered with the application by a plug-in provider during runtime, wherein said extension supports a particular segment of the next document specified by the plug-in provider; and
means for adding the received extensions to the preexisting DTD to dynamically create the new DTD.

3. The computer system of claim 2 wherein the received extensions are received through an interface utilized by a plug-in provider
wherein the interface returns a string containing DTD information for at least one new element to be added as the at least one extension and a name of the added element that is to be added to an existing parameter entity; and
wherein the means for adding further comprises means for adding the DTD information to an element section of the preexisting DTD and adding the name of the added element to a corresponding entity section the preexisting DTD.

4. The computer system of claim 1 further comprising means for validating the parsed next document according to the new DTD.

5. A computer program on a volatile or non-volatile machine-readable medium having computer readable program code stored thereon, wherein the computer readable program code instructs a computer to perform the following steps for processing documents having a document type definition (DTD):

receiving at least one extension to a preexisting document type definition of an application during runtime comprising a plug-in with a DTD fragment having elements and attributes;

responsive to receiving the at least one extension to the preexisting document type definition of the application during runtime, automatically dynamically creating, during runtime, a new document type definition including the at least one extension from the preexisting document type definition of the application by combining static header XML information of the preexisting document type definition, updated parameter entities of the preexisting document type definition produced from added element names of the elements and attributes of the plug-in, and element information for the added element names produced from the plug-in DTD fragment, wherein the new document type definition continues to support validation of previous documents for the application; and enabling parsing a next document received by the application according to the dynamically created document type definition.

* * * * *